US012415681B2

(12) United States Patent
Vanderhoef et al.

(10) Patent No.: US 12,415,681 B2
(45) Date of Patent: Sep. 16, 2025

(54) CONVEYOR LOAD TRACKING SYSTEM

(71) Applicants: DAIFUKU AIRPORT AMERICA CORPORATION, Novi, MI (US); DAIFUKU CO., LTD., Osaka (JP)

(72) Inventors: Ryan Vanderhoef, Troy, MI (US); Matthew Sornig, Royal Oak, MI (US); Dylan Leopold, Saline, MI (US)

(73) Assignees: DAIFUKU AIRPORT AMERICA CORPORATION, Novi, MI (US); DAIFUKU CO., LTD., Osaka (JP)

( * ) Notice: Subject to any disclaimer, the term of this patent is extended or adjusted under 35 U.S.C. 154(b) by 728 days.

(21) Appl. No.: 17/844,279

(22) Filed: Jun. 20, 2022

(65) Prior Publication Data
US 2022/0402703 A1    Dec. 22, 2022

Related U.S. Application Data

(60) Provisional application No. 63/212,833, filed on Jun. 21, 2021.

(51) Int. Cl.
*B65G 43/10*    (2006.01)
*B65G 37/00*    (2006.01)

(52) U.S. Cl.
CPC ........... *B65G 43/10* (2013.01); *B65G 37/005* (2013.01); *B65G 2201/0264* (2013.01); *B65G 2203/0233* (2013.01); *B65G 2203/0283* (2013.01)

(58) Field of Classification Search
CPC .......... B65G 43/10; B65G 37/005; B65G 2201/0264; B65G 2203/0233; B65G 2203/0283; B65G 43/08
See application file for complete search history.

(56) References Cited

U.S. PATENT DOCUMENTS

| 3,955,678 | A | * | 5/1976 | Moyer | B65G 47/50 209/583 |
| 4,274,783 | A | * | 6/1981 | Eineichner | B65G 47/40 377/3 |
| 5,335,777 | A | * | 8/1994 | Murphy | B65G 43/08 198/349.8 |
| 7,236,409 | B2 | | 6/2007 | Isobe | |
| 7,263,409 | B2 | * | 8/2007 | LeVasseur | B65G 43/10 198/572 |
| 8,733,656 | B2 | * | 5/2014 | Wang | G06K 7/10861 235/454 |

* cited by examiner

*Primary Examiner* — Michael Collins
(74) *Attorney, Agent, or Firm* — Dickinson Wright PLLC

(57) ABSTRACT

A conveyor load tracking method, including associating a designated load with a designated load data record associated with a designated load location record encompassing a first segment of the conveyor and designated load expected travel distances after associated conveyor travel. An unknown load is detected entering a second segment with a sensor outside of the designated load expected travel distances, and a new data record associated with the unknown load is created. The new data record is associated with a new location record encompassing the second segment and encompassing new expected load travel distances of the unknown load after associated conveyor travel. The sensor detects that the designated load is not present at the at a first expected travel distance, and in response the designated load data record is disassociated from the designated load location record, and paired with the new data record and its new location record.

19 Claims, 13 Drawing Sheets

Note 1: Load Moved Forward, the Calculated Load Movement (B) Has Not Been Detected as Missing Yet and the Load Record Remains Note 2: Load Moved Backwards, the Calculated Load Movement (B) Has Been Detected as Missing and the Load Record Has Been Marked "Unassigned to Physical Load"

CONVEYOR LOAD TRACKING SYSTEM

CROSS-REFERENCE TO RELATED APPLICATIONS

This U.S. Utility Patent Application claims the benefit of and priority to U.S. Provisional Patent Application Ser. No. 63/212,833, filed Jun. 21, 2021, titled "Conveyor Load Tracking System," the entire disclosure of which is hereby incorporated by reference in its entirety.

FIELD OF THE DISCLOSURE

The present disclosure relates to a system for tracking loads on conveyors. More particularly, the present disclosure relates to a system that tracks loads on conveyors even after unexpected movement of the loads.

BACKGROUND OF THE DISCLOSURE

This section provides background information related to the present disclosure which is not necessarily prior art.

In the fields of material handling, industrial processing, and baggage systems, automated equipment is used to transport loads (e.g., manufacturing loads or luggage items) automatically through various processing steps on transportation systems such as conveyors. Typically, as loads move on conveyor, it is necessary to track each load's location for use in conveyor operation. Known tracking systems are described in U.S. Pat. Nos. 5,335,777 and 7,236,409 (each incorporated herein in their entireties by reference).

It is known for a load tracking conveyor system to include an array of load records each associated with a load on the conveyor, and an array of associated locations of the loads along the conveyor for tracking locations of the loads on the conveyor. In an event where a load is moved from its original location or removed from the conveyor, a memory of the missing load is maintained in the array of load records, thus the load remains unavailable as it is stored data that may be used for reconstruction in the future. This system requires the load record array to be large because it must accommodate unavailable records, i.e., records of missing loads with potential reconstruction status. This system also requires additional management of the load record array to determine what records are available to be recovered, which records are available for reuse, and which records need to be changed from recoverable to reusable status after certain durations or events. This approach can make it difficult to scale the load record array. Records cannot be used for new loads in the tracking model if it must contain missing load information until such time that it may be reconstructed. Therefore, the load record array must be sized large to accommodate an additional load record for every location, and additional management to determine which individual records changed from recoverable to non-recoverable.

There remains a need for further improvements to such tracking systems.

SUMMARY OF THE DISCLOSURE

This section provides a general summary of the disclosure and is not intended to be interpreted as a comprehensive listing of its full scope or of all of its objects, aspects, features and/or advantages.

According to an aspect of the disclosure, a system is provided that includes a controller that maintains a list of data records for loads as they travel on one or more conveyor segments. The records include an individual data record unique to each load. The controller also maintains a list of location records of the loads on the conveyor segments. The controller manages links between the lists in a load tracking model. The system is capable of accommodating unexpected movements of the loads along the conveyor segments in a simple manner.

More particularly, the controller measures an amount of travel on the conveyor and uses one or more sensor events/readings to positively confirm the location of actual loads at physical locations. The controller compares the sensor events to predetermined/expected travel distance of the loads. The controller updates the list of locations and links to the list of records upon sensor events. When the controller expects a sensor event based on a predetermined travel distance and one does not occur, the controller removes the record from load tracking (missing load). When the controller does not expect a sensor event based on a predetermined travel distance, but one does occur, the controller assigns a new record from load tracking to the newly sensed load (unexpected load).

According to these and other aspects of the disclosure, a method for tracking a plurality of loads on a conveyor is provided. The method includes providing a conveyor configured to move the loads in a travel direction relative to an entrance of the conveyor. The conveyor includes a plurality of segments arranged in end to end relationship with one another in the travel direction. The plurality of segments include at least a first segment and a second segment. The method includes providing a first sensor located between the first and second segments. The method also includes associating a designated load of the loads with a designated load data record. The method also includes associating the designated load data record with a designated load location record encompassing the first segment of the conveyor and encompassing designated load expected travel distances of the designated load in the travel direction along the first segment after associated conveyor travel distances. The method also includes detecting a presence of an unknown load of the loads entering the second segment with the first sensor outside of the designated load expected travel distances of the first location record, and creating a new data record associated with the unknown load. The method also includes associating the new data record with a new location record encompassing the second segment of the conveyor and encompassing new expected load travel distances of the unknown load of the new data record in the travel direction along the second segment after associated conveyor travel distances. The method also includes detecting with the first sensor that the designated load is not present at the first sensor at the designated load expected travel distance associated with the first sensor. The method also includes disassociating the designated load data record from the designated load location record and pairing the designated load data record with the new data record such that the designated load is tracked with the new location record of the new data record. In other words, in order to accommodate unexpected movement of the designated load, the method disassociates the designated load from its original location data and instead tracks the designated load via the location data associated with the unknown load (i.e., the new location of the designated load).

Another method for tracking a plurality of loads on a conveyor includes providing a conveyor configured to move the loads in a travel direction relative to an entrance of the conveyor. The conveyor includes a plurality of segments arranged in end to end relationship with one another in the travel direction. The plurality of segments includes at least a first segment and a second segment. The method also includes providing a first sensor located between the first and second segments. The method also includes associating a frontward load of the loads with a frontward load data record. The method also includes associating the frontward load data record with a frontward load location record encompassing the first segment of the conveyor and encompassing frontward load expected travel distances of the frontward load in the travel direction along the first segment after associated conveyor travel distances. The method also includes associating a middle load that is located upstream of the frontward load with a middle data record. The method also includes associating the middle data record with a middle location record encompassing the first segment of the conveyor and encompassing middle load expected load travel distances of the middle load in the travel direction along the first segment after associated conveyor travel distances. The method also includes associating a rearward load that is located upstream of the middle load with a rearward load data record. The method also includes associating the rearward load data record with a rearward load location record encompassing the first segment of the conveyor and encompassing rearward load expected load travel distances of the rearward load in the travel direction along the first segment after associated conveyor travel distances. The method also includes detecting the frontward load entering the second segment with the first sensor in accordance with the frontward load expected travel distance of the frontward load location record. The method also includes detecting a presence of an unknown load of the loads entering the second segment with the first sensor outside of the second expected load travel distances of the second location record, and creating a new data record associated with the unknown load. The method also includes associating the new data record with a new location record encompassing the second segment of the conveyor and encompassing new expected load travel distances of the unknown load of the new data record in the travel direction along the second segment after associated conveyor travel distances. The method also includes detecting with the first sensor that the middle load is not present at the first sensor at the middle load expected travel distance associated with the first sensor. The method also includes detecting the frontward load entering the second segment with the first sensor in accordance with the frontward load expected load travel distance of the third load. The method also includes disassociating the middle load data record from the middle load location record and pairing the middle load data record with the new data record such that the middle load of the middle load data record is tracked with the new location record of the new data record. In other words, the method includes the step of confirming that the frontward, most downstream load and the rearward, most upstream load are properly detected at the first sensor at their expected travel distances. This confirms that the unknown load is in fact the new location of the missing middle load and thus it is appropriate to pair the middle load data record of the middle load with the new data record of the unknown load.

A system for conveying and tracking loads is also provided. The system includes a conveyor having an entrance and configured to move the loads in a travel direction. The conveyor has a plurality of segments arranged in end to end relationship with one another. A first sensor is located between the first and second segments. A controller is configured to execute the steps of associating a designated load of the loads with a designated load data record, associating the designated load data record with a designated load location record encompassing the first segment of the conveyor and encompassing designated load expected travel distances of the load of the designated load data record in the travel direction along the first segment after associated conveyor travel distances, detecting a presence of an unknown load of the loads entering the second segment with the first sensor outside of the designated load expected travel distances of the middle location record, and creating a new data record associated with the unknown load, associating the new data record with a new location record encompassing the second segment of the conveyor and encompassing new expected load travel distances of the unknown load of the new data record in the travel direction along the second segment after associated conveyor travel distances, detecting with the first sensor that the designated load is not present at the first sensor at the designated load expected travel distance associated with the first sensor, disassociating the designated load data record from the designated load location record, and pairing the designated load data record with the new data record such that the designated load is tracked with the new location record of the new data record of the unknown load. In other words, in order to accommodate unexpected movement of the designated load, the controller is configured to disassociate the designated load from its original location data and instead tracks the designated load via the location data associated with the unknown load (i.e., the new location of the first load).

DRAWINGS

The drawings described herein are for illustrative purposes only of selected embodiments and not all possible implementations thereof such that the drawings are not intended to limit the scope of the present disclosure.

FIG. 13 is a flow diagram illustrating a method for tracking loads on a conveyor.

DETAILED DESCRIPTION OF THE EXAMPLE EMBODIMENTS

Example embodiments of a conveyor load tracking system embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms that may be combined in various ways, and that neither should be construed to limit the scope of the disclosure. In some example embodiments, well-known processes, well-known device structures, and well-known technologies are not described in detail.

Figure 1:
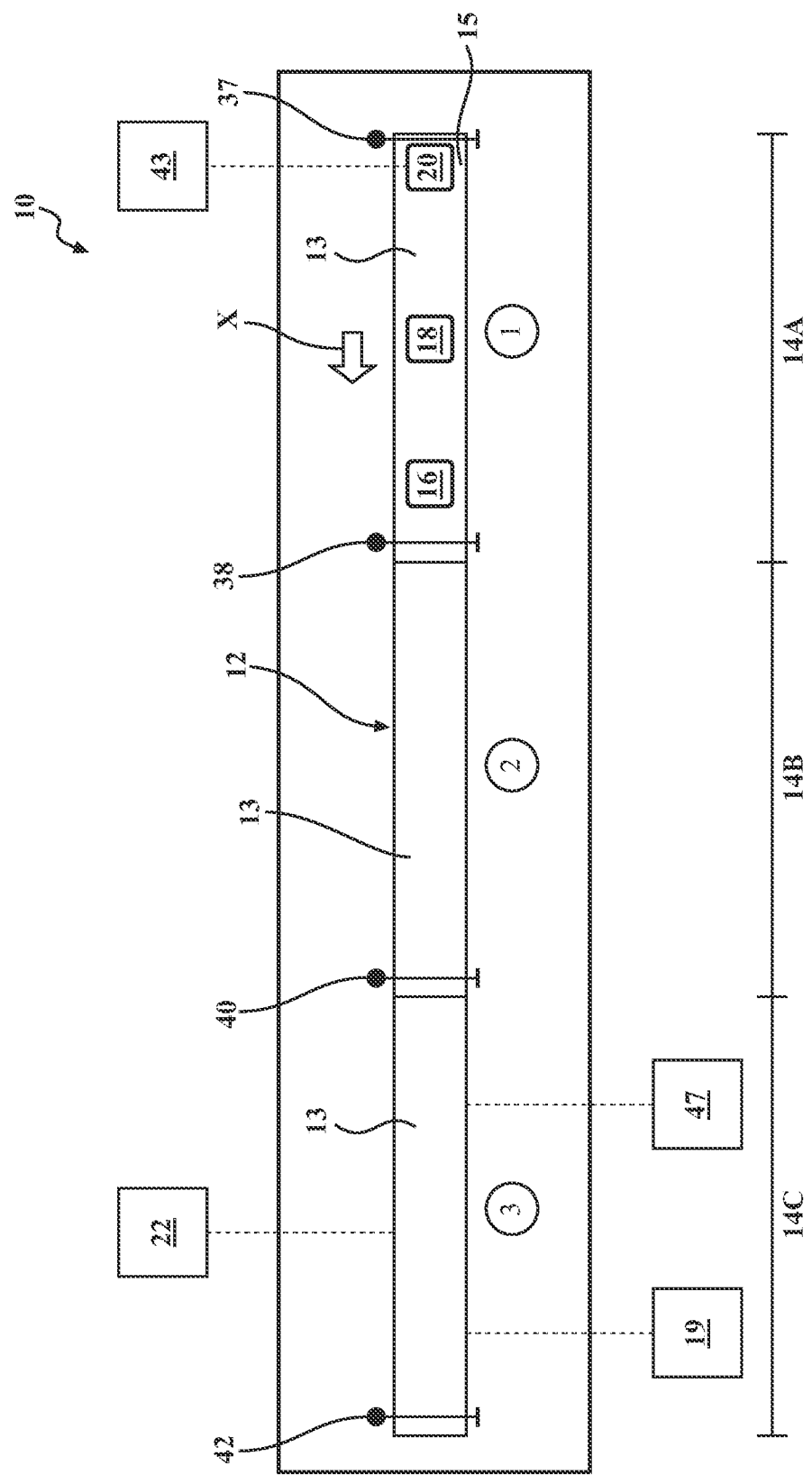
FIG. 1 is top schematic view of a conveyor, sensors and loads of an embodiment of a load tracking system.

More particularly, referring to the figures, wherein like numerals indicate corresponding parts throughout the several views, a conveyor load tracking system 10 is shown. As shown in FIG. 1, the conveyor load tracking system 10 includes a conveyor 12 which includes one or more belts 13 or other transporting elements that each have a top surface that travels in a direction of travel X. The conveyor 12 is divided into a plurality of segments 14A, 14B, 14C arranged in end-to-end relationship with one another. The segments 14A-C may be portions of a single belt 13, or comprised of multiple belts 13. As shown, a first segment 14A may be located at an entrance 15 of the conveyor 12, a second segment 14B may be positioned at an end of the first segment 14A, and a third segment 14C may be located at an end of the second segment 14B. The third segment 14C may terminate at an end 17 of the conveyor 12. It should be appreciated that the segments 14A-14C could extend in various directions and thus the direction of travel may vary along different lengths of the conveyor 12. The one or more belts 13 are sized and configured for supporting and transporting one or more loads 16, 18, 20. The term "load" as used herein may include various types of articles, including but not limited to work pieces in a manufacturing setting or luggage items in a transportation hub. FIG. 1 illustrates an example arrangement including a frontward load 16, a middle load 18 and a rearward load 20 arranged on the conveyor 12. It should be appreciated that the terms "frontward," "middle" and "rearward" describe special relationships of the loads 16, 18, 20 relative to one another and do not require the loads 16, 18, 20 to be at an absolute front, rear or middle of a group of loads 16, 18, 20. For example, there may be several loads positioned downstream of the frontward load 16, and there may be several loads positioned upstream of the rearward load 20 for any given sample of loads.

The conveyor 12 is powered by a motor 19 which is controlled by a controller 22 (schematically shown). The controller 22 may take various forms and is configured to selectively activate the conveyor 12 and to manage a load inventory. As part of this arrangement, the controller 22 is also connected to several load detecting sensors 37, 38, 40, 42.

Figure 2:
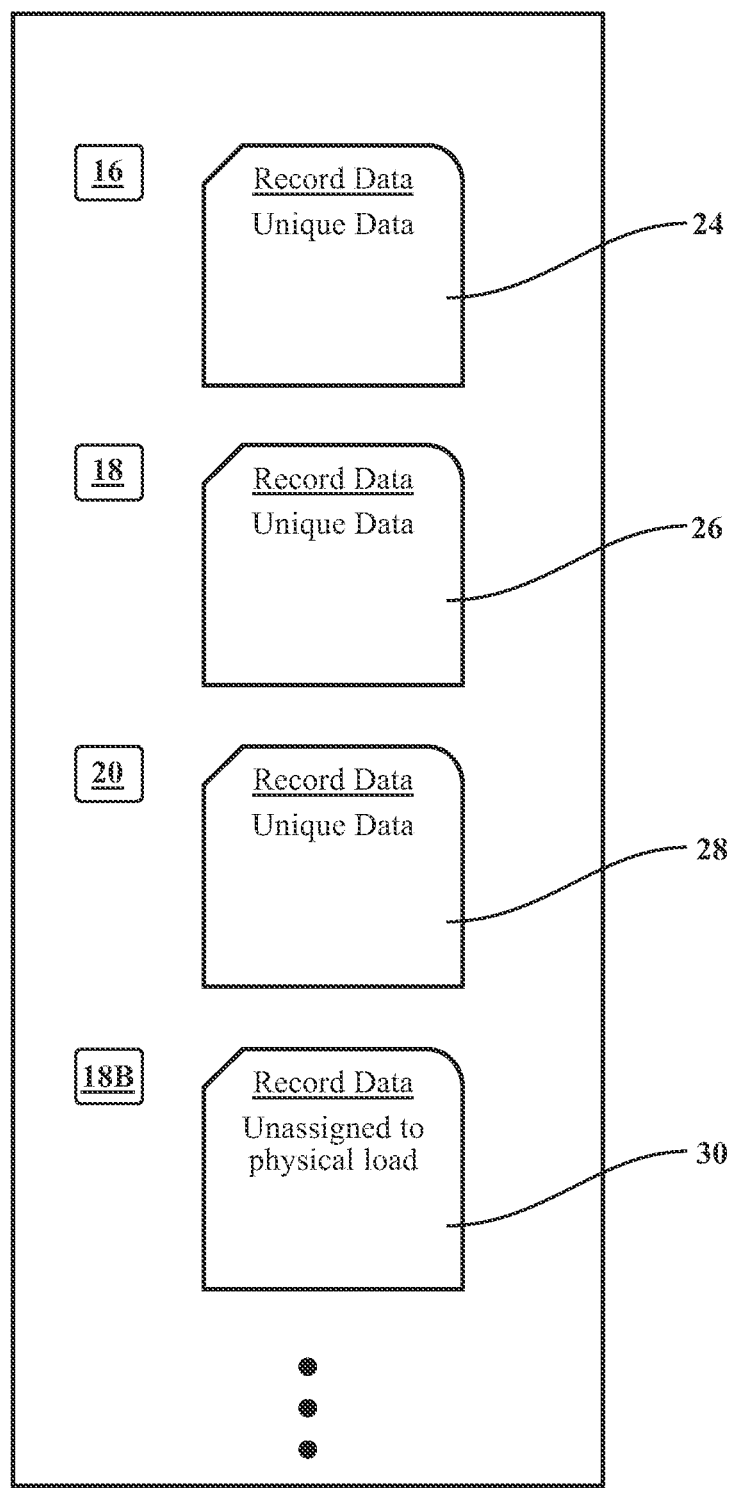
FIG. 2 is a schematic view of records data associated with loads of the load tracking system.
Figure 3:
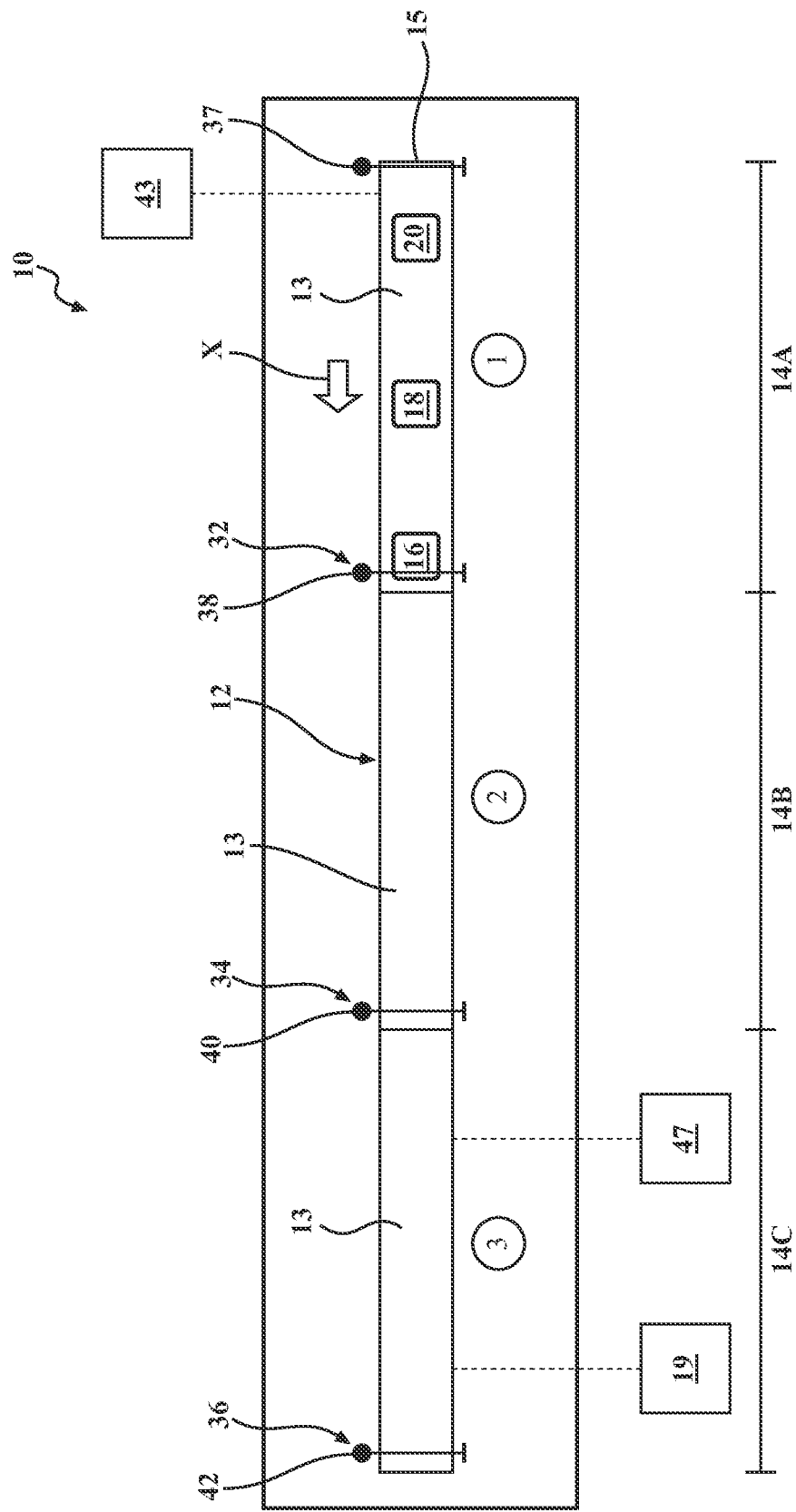
FIG. 3 is a top schematic view of the conveyors, sensors and loads of the load tracking system, illustrating the loads after moving a first distance.

As illustrated in FIG. 2, each of the loads 16, 18, 20 are assigned to a data record associated with the load 16, 18, 20 which is saved by the controller 22 in a load record list. As shown in the example of FIGS. 1-2, the frontward load 16 is assigned to a first, or frontward data record 24, the middle load 18 is assigned to a second, or middle data record 26 and the rearward load 20 is assigned to a third, or rearward data record 28. Any number of data records may be associated with any number of loads as needed. The load record associated with each load may include any information needed to track, describe and route the load 16, 18, 20. Information associated with each load 16, 18, 20 may be provided to the controller 22 by any means including bar code readers, radio frequency tag readers, weigh scales, profiling sensors, vision systems, operator keyboards or any other devices connected to or in communication with the controller 22. For example, a bar code scanner may be provided at an entrance of the conveyor 12 for establishing records of each load 16, 18, 20.

As further illustrated in FIG. 1, the plurality of sensors 37, 38, 40, 42 are provided for detecting the presence of the loads 16, 18, 20 at different locations along the conveyor 12. As previously noted, the sensors 37, 38, 40, 42 are electrically connected to the controller 22 for transmitting detection data to the controller 22. As illustrated in FIG. 1, an entrance sensor 37 is located at an entrance 15 of the conveyor 12 at a beginning end of the first segment 14A where the loads 16, 18, 20 enter the conveyor 12. Accordingly, the entrance sensor 37 is configured to detect when the loads 16, 18, 20 enter the conveyor 12. A first sensor 38 is located between the first and second segments 14A, 14B of the conveyor 12, a second sensor 40 is located between the second and third segments 14B, 14C, and a third, exit sensor 42 is located at an end of the third segment 14C. It should be appreciated that any number of sensors could be employed as needed. The sensors 37, 38, 40, 42 may be configured to detect any point or length of the loads 16, 18, 20, e.g., a leading edge, a trailing edge or both for identifying a location of the load 16, 18, 20.

An encoder 43 (schematically shown) is mounted to a shaft of a conveyor idler pulley and produces a pulse signal which is communicated to the controller 22. The period of pulses is directly proportional to a speed of the conveyor 12 such that the conveyor 12 travels to a fixed distance in the time between an occurrence of adjacent pulses. Pulse signals from the encoder 43 are used to measure travel of the conveyor 12 during a given time period. For example, if the conveyor 12 is 20 feet long and the encoder 43 produces a pulse for every two inches of conveyor travel, the encoder 43 will produce 120 pulses while a load is conveyed from one end of the conveyor 12 to the other in the event that there is no slippage of the load on the conveyor 12. The number of pulses produced depends only on the motion the belt 13 of the conveyor 12. The number of pulses produced is not affected by any starting or stopping of the belt 13. The number of pulses may be calculated between the sensors 37, 38, 40, 42 for determining expected travel distances of the loads 16, 18, 20. It should be appreciated that conveyor travel may be tracked in other manners.

Figure 4B:
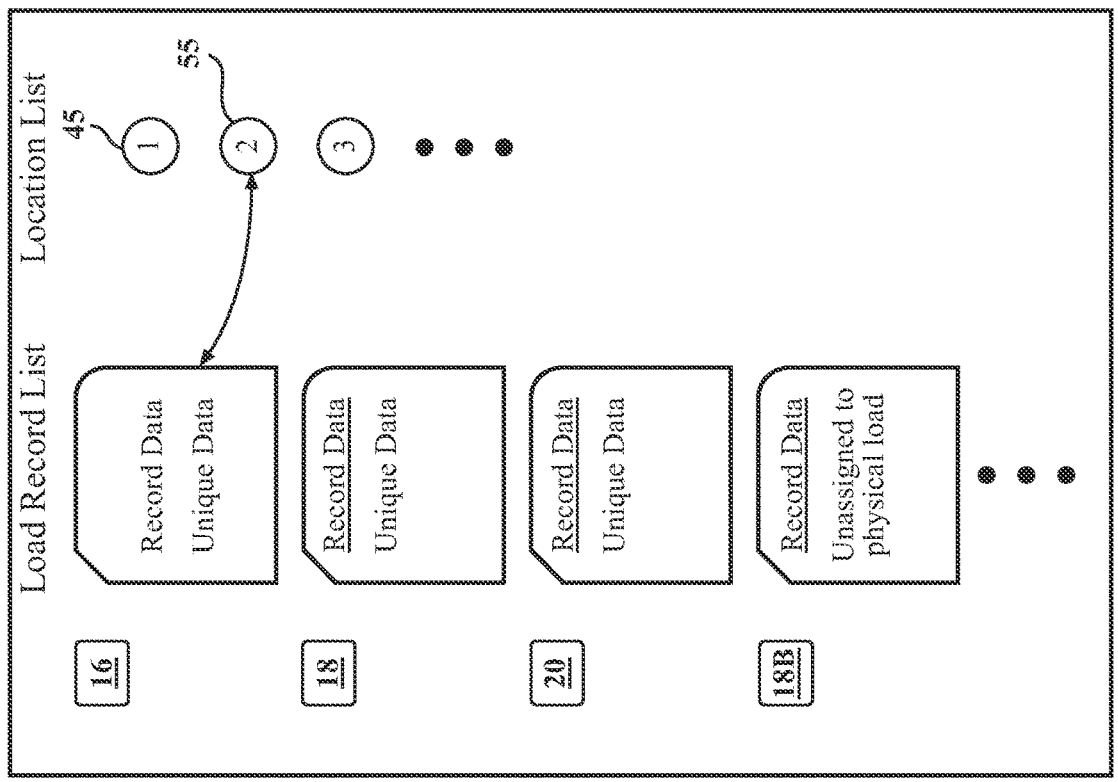
FIG. 4B is a schematic view of records data associated with the loads of the load tracking system illustrating record tracking of the first load after movement of the first load to a second segment of the conveyor.
Figure 4A:
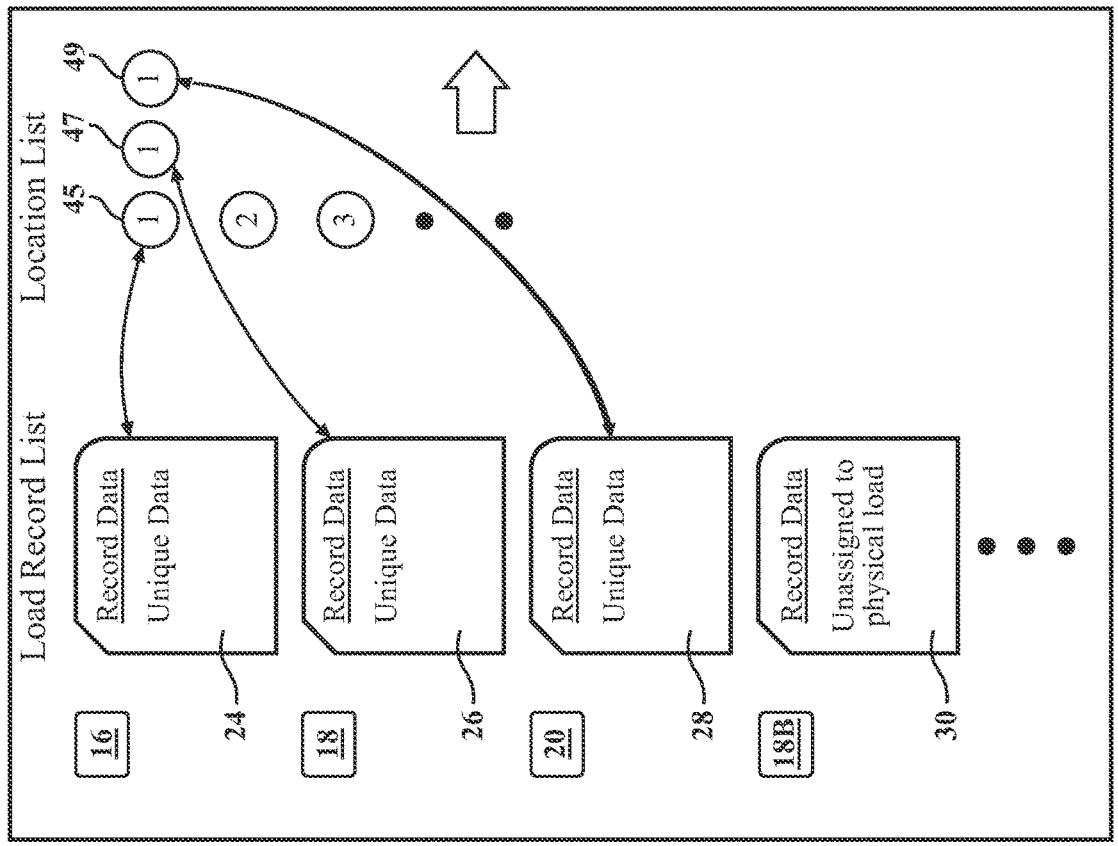
FIG. 4A is a schematic view of records data associated with the loads of the load tracking system prior to moving the distance presented in FIG. 3.

As illustrated in FIG. 4A, the controller 22 actively updates the data records associated with each of the loads 16, 18, 20. Notably, the controller 22 actively links/associates each of the data records associated with each load 16, 18, 20 to a location record. Each location record generally relates to a predetermined expected travel distance of the associated load 16, 18, 20 along the conveyor 12 relative to the entrance 15 of the conveyor 12. The distance covered relative to the entrance 15 may be associated with the distance covered after passing by the entrance sensor 37. As previously noted, the movement of each load 16, 18, 20 may be calculated based on a counted number of pulses generated by a shaft of the conveyor 12 counted by the encoder 43 during rotation of the shaft. In the instance where the conveyor 12 is comprised of more than one belt 13, each respective conveyor segment 14A-C may have its own encoder 43, with data from the respective belts 13 sequenced with one another.

As shown, each location record may be associated with what segment 14A-14C of the conveyor 12 the load 16, 18, 20 is presently located at. For example, as illustrated in FIG. 4A, the frontward load 16 is initially linked to a first, or frontward load location record 45 in response to a detection by the entrance sensor 37 that the frontward load 16 is positioned on the first segment 14A. As illustrated in FIG. 4B, when the frontward load 16 passes the first sensor 38 at an expected conveyor travel distance and moves to the second segment 14B, the first data record 24 associated with the frontward load 16 is delinked/disassociated from the first location record 45 and is linked to an updated location record 55 associated with the second segment 14B. The location record of each data record may also include more specific expected travel distances. For example, the first location record 45 may include a first, or frontward load expected travel distance in the travel direction along the first segment 14A after associated travel of the conveyor belt 13, and the updated location record 55 may include an updated expected travel distance in the travel direction along the second segment 14B after associated travel of the conveyor belt 13. In other words, each location record encompasses anticipated locations of where the associated load 16 should be located after associated movements along the conveyor 12. For example, the first location record 45 may expect the frontward load 16 to reach the first sensor 38 after a predetermined number of pulses signals by the encoder 43.

The system includes a method for governing reconstructing of the data records associated with loads under this scenario. With reference to the flow diagram presented in FIG. 13, the method includes 100 detecting each of the loads 16, 18, 20 entering the conveyor 12 with the entrance sensor 37. With further reference to FIG. 13 and to FIG. 4A, after entrance of each load 16, 18, 20 on the conveyor 12, the method continues with using the controller 22 to 101 associate the frontward load 16 of the loads 16, 18, 20 with the first data record 24. The controller 22 then 102 associates the first data record 24 with a first location record 45 encompassing the first segment 14A of the conveyor 12, and encompassing first expected load travel distances (i.e., frontward load expected travel distances) of the first load 16 of the first data record 24 in the travel direction along the first segment 14A after associated conveyor travel distances. The system 10 is also configured to 104 associate the middle load 18 of the loads 16, 18, 20 with a second, or middle load data record 26. The controller 22 also 106 associates the second data record 26 with a second, or middle load location record 47 encompassing the first segment 14A of the conveyor 12 and encompassing second, or middle load expected load travel distances of the middle load 18 of the second data record 26 in the travel direction along the first segment 14A after associated conveyor travel distances. Furthermore, the controller 22 also 108 associates a rearward load 20 of the loads with a third, or rearward load data record 28. Additionally, the controller 22 is configured to 110 associate the third data record 28 with a third, or rearward load location record 49 encompassing the first segment 14A of the conveyor 12, and encompassing third, or rearward load expected load travel distances of the rearward load 20 of the third data record 28 in the travel direction along the first segment 14A after associated conveyor travel distances. These steps may be repeated for any number of loads that are received on the conveyor 12.

Figure 5A:
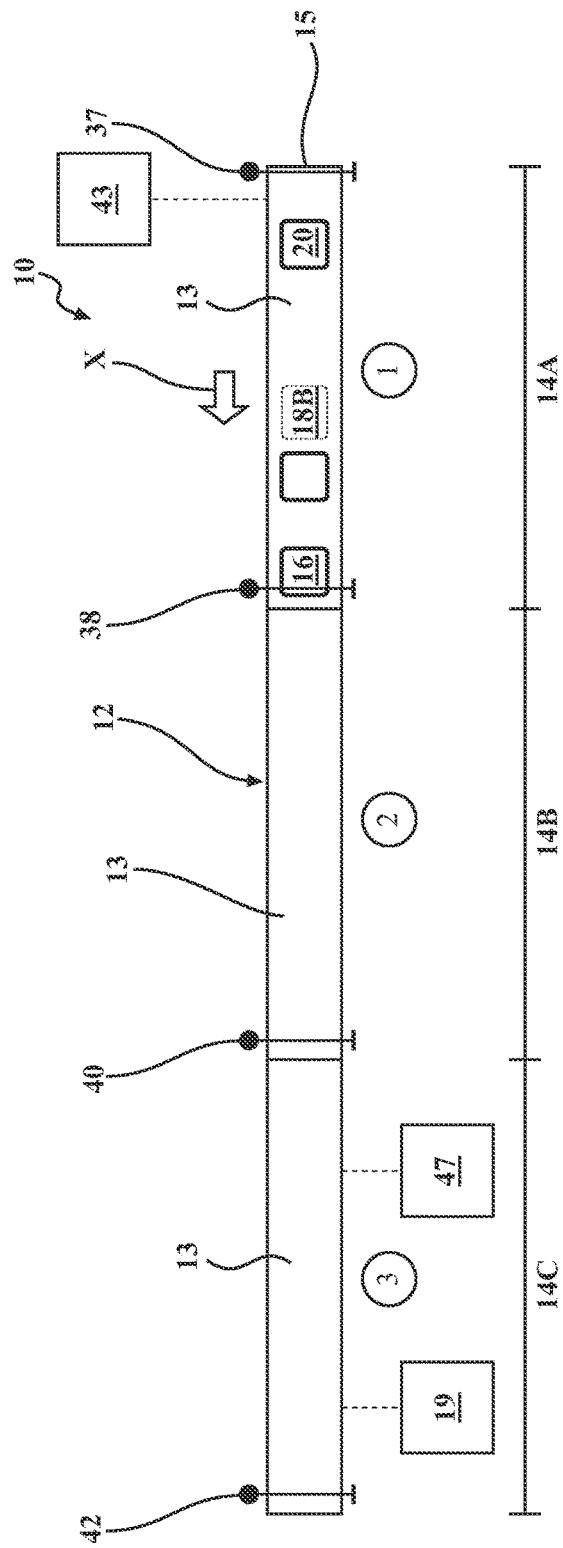
FIG. 5A is a top schematic view of the conveyors, sensors and loads of the load tracking system, illustrating the loads after moving a distance in a scenario in which a second load has unexpectedly moved forward.
Figure 5B:
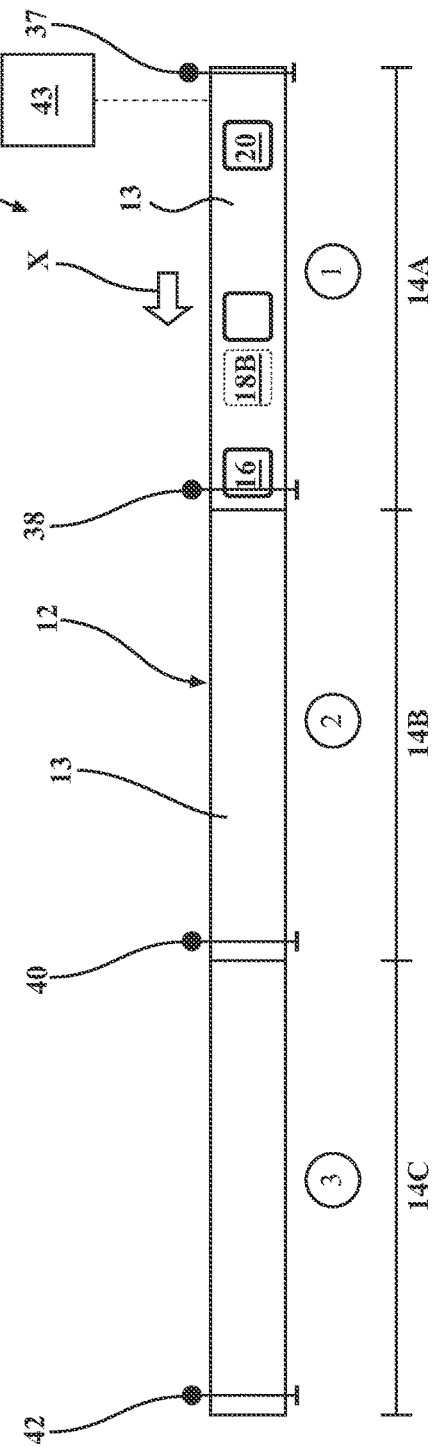
FIG. 5B is a top schematic view of the conveyors, sensors and loads of the load tracking system, illustrating the loads after moving a distance in a scenario in which the second load has unexpectedly moved backward.

As shown in FIGS. 4B and 5A-5B, according to an example operation, the controller 22 next 111 detects that the frontward load 16 is entering the second segment 14B with the first sensor 38 in accordance with the first load expected travel distance of the first location record 45 and thus 112 disassociates the first data record 16 from the first location record 45 and 114 associates the frontward load 16 with an updated location record 55 that encompasses the second segment 14B of the conveyor 12, and encompasses updated expected load travel distances of the frontward load 16 in the travel direction along the second segment 14B after associated conveyor 12 travel distances.

Figure 6A:
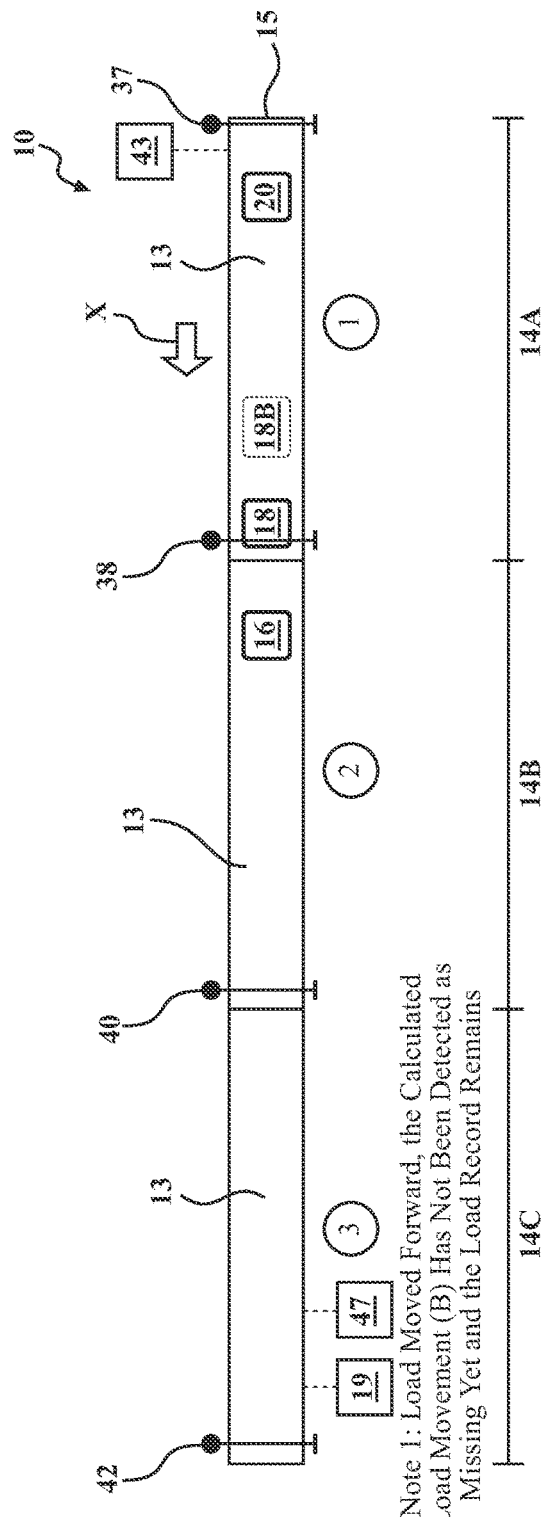
FIG. 6A is a top schematic view of the conveyors, sensors and loads of the load tracking system, illustrating the loads after moving a second distance in the scenario in which the second load has unexpectedly moved forward.
Figure 6B:
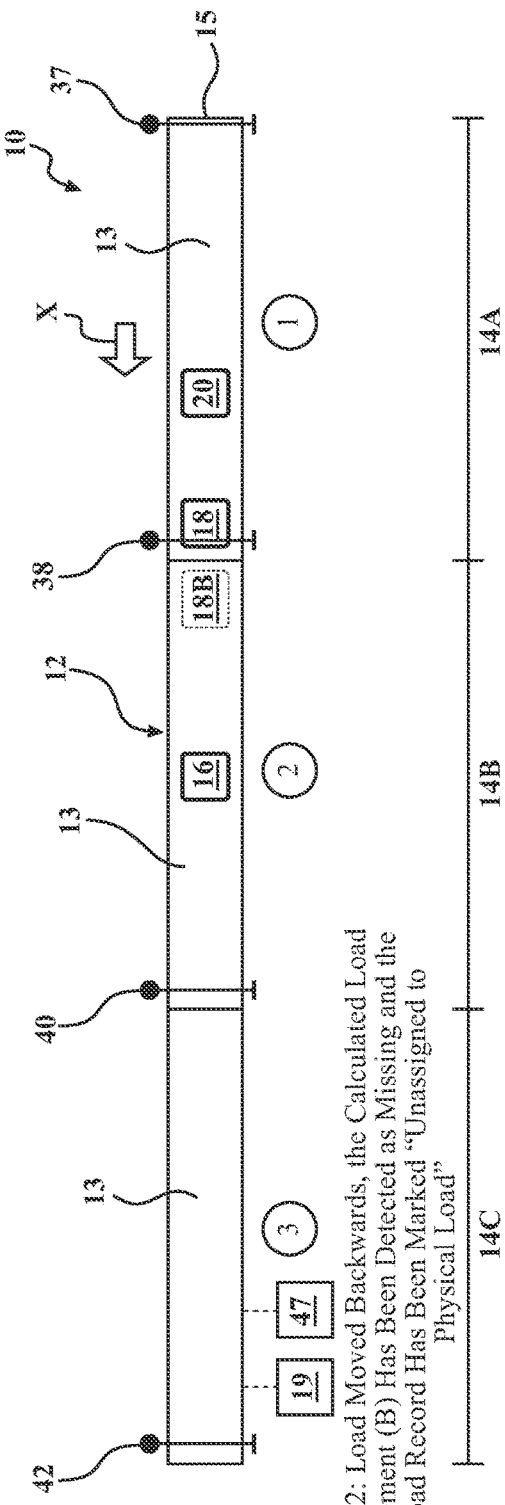
FIG. 6B is a top schematic view of the conveyors, sensors and loads of the load tracking system, illustrating the loads after moving a second distance in the scenario in which the second load has unexpectedly moved backward.
Figure 7:
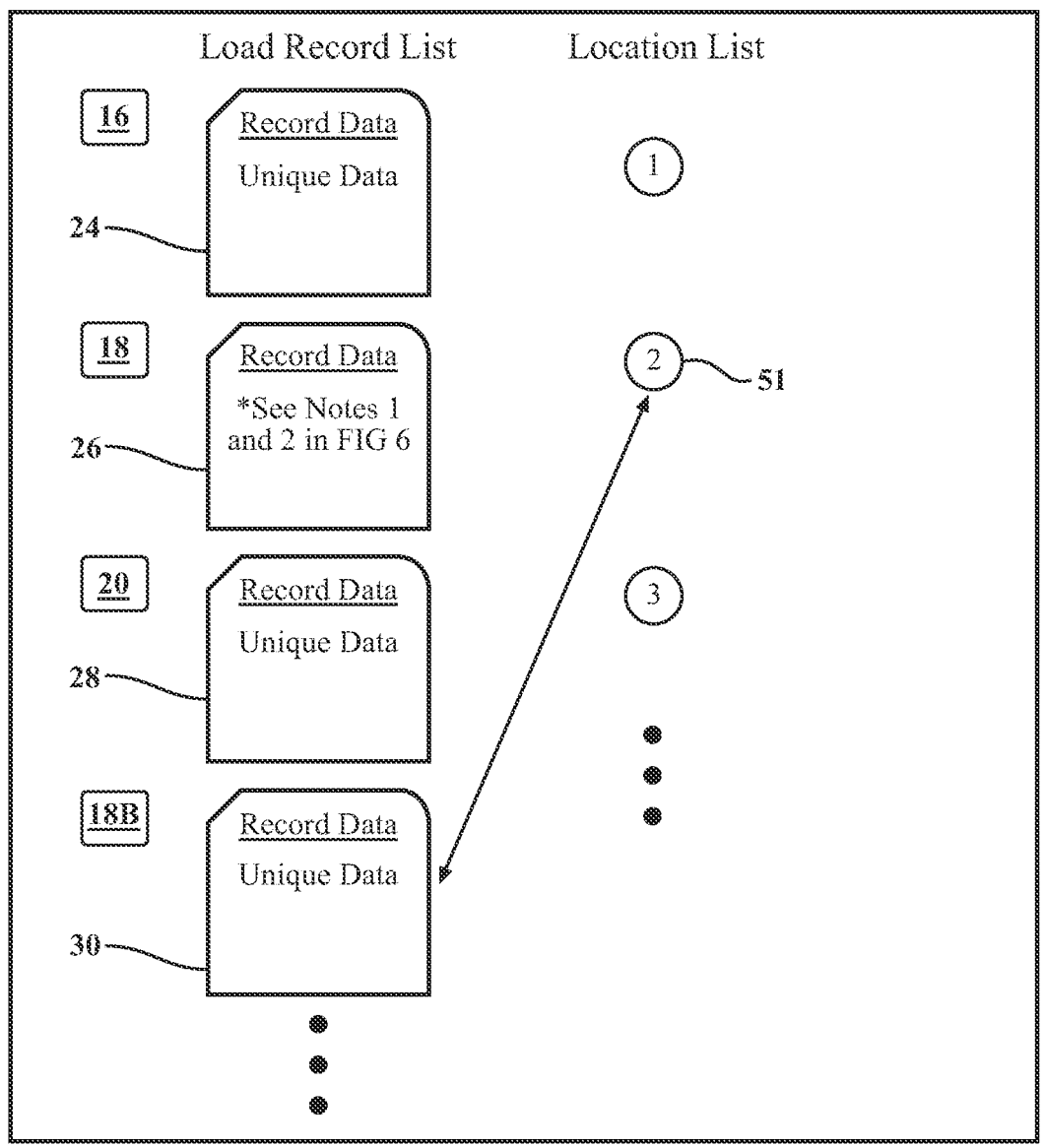
FIG. 7 is a schematic view of record data associated with the loads of the load tracking system after moving in accordance with FIGS. 6A and 6B.

FIGS. 5A and 5B further illustrate scenarios in which the middle load 18 unexpectedly shifts along the conveyor 12 (e.g., after being held or nudged) such that it is located at an unexpected load travel distance relative to the first sensor 38 relative to the second expected travel distance associated with the second load location record 47. More particularly, FIG. 5A illustrates a situation in which the middle load 18 has moved forward (downstream) relative to its initial placement on the conveyor 12, and FIG. 5B illustrates a situation in which the middle load 18 has moved backward (upstream) relative to its initial placement FIGS. 6A and 6B illustrate the same loads 16, 18, 20 of FIGS. 5A-5B after further movement of the conveyor 12. More particularly, according to FIG. 6A, in the scenario in which the middle load 18 has unexpectedly moved downstream relative to its initial placement, the middle load 18 passes by the first sensor 38 earlier than expected (at an unexpected load travel distance) and thus is considered by the controller 22 to be an unknown load. The expected location of the middle load 18 is indicated by reference numeral 18B in the drawings. Therefore, the controller 22 executes the step of 116 detecting an unknown load. In response to the detection of the unknown load, as illustrated in FIG. 7, the controller 22 proceeds by 118 creating a new data record 30 associated with the unknown load. The controller 22 then 120 associates the new data record 30 with a new location record 51 that encompasses the second segment 14B of the conveyor 12 and encompasses new expected load travel distances of the unknown load of the new data record 30 in the travel direction along the second segment 14B after associated conveyor travel distances. In this situation, the middle load 18 has not yet been flagged as missing, thus the second data record 26 remains. On the other hand, according to FIG. 6B, in the scenario in which the middle load 18 has moved upstream, no middle load 18 is detected at the first expected load travel distance (a missing load event) at the first sensor 38, thus the second data record 26 associated with the middle load 18 is indicated as "unassigned to physical load" and disassociated from the second load travel distance. In either scenario, as illustrated in FIG. 7, the controller 22 is configured to 114 link the new data record 30 to the new location record 51 as a potential for reconstruction.

Figure 8A:
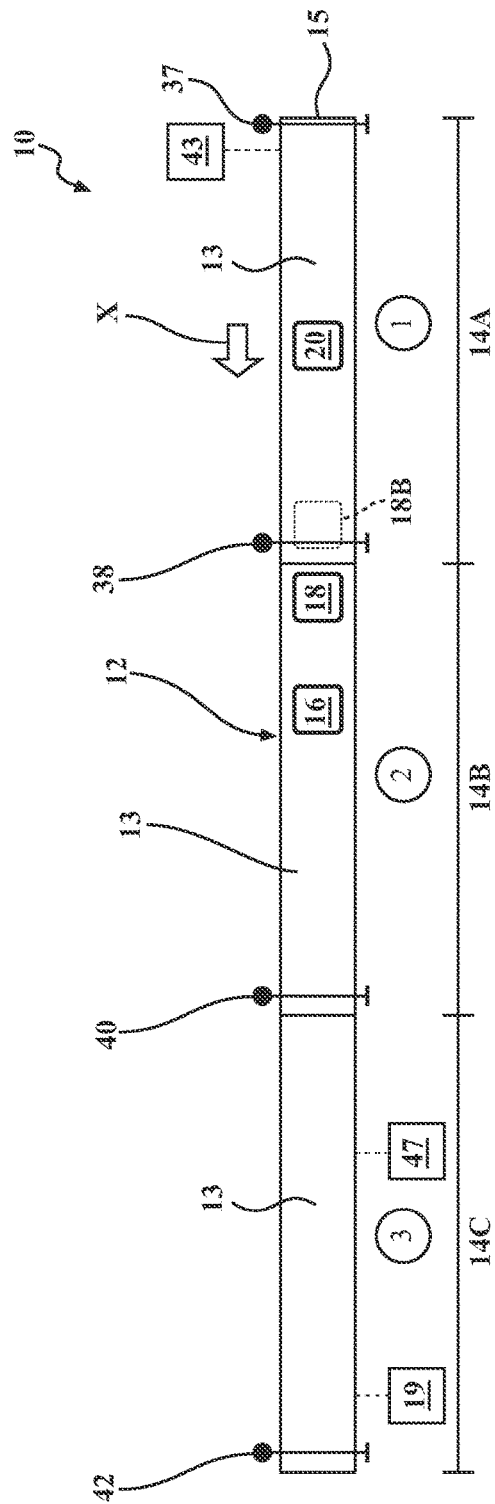
FIG. 8A is a top schematic view of the conveyors, sensors and loads of the load tracking system, illustrating the loads after moving a third distance in the scenario in which the second load has unexpectedly moved forward.
Figure 8B:
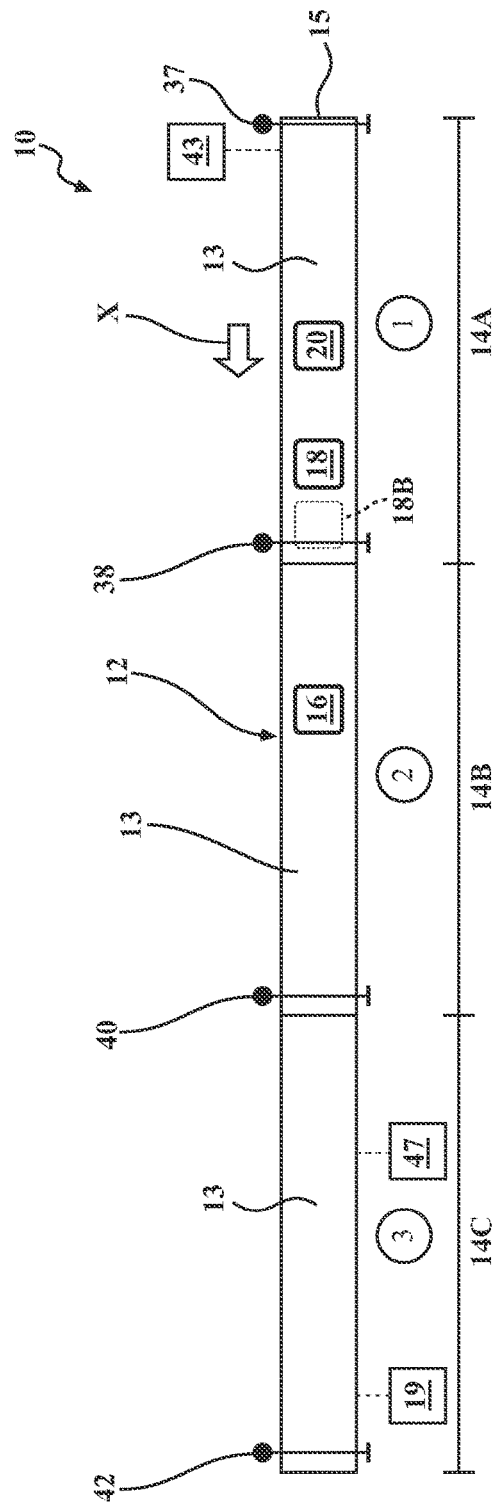
FIG. 8B is a top schematic view of the conveyors, sensors and loads of the load tracking system, illustrating the loads after moving a third distance in the scenario in which the second load has unexpectedly moved backward.

FIGS. 8A and 8B illustrate the same loads 16, 18, 20 after further movement of the conveyor 12. More particularly, FIG. 8A presents the scenario with the forward located middle load 18, and when no middle load 18 is detected at the first sensor 38 at the expected/predetermined distance for the middle load 18. FIG. 8B presents the scenario with the rearward located middle load 18.

Figure 9:
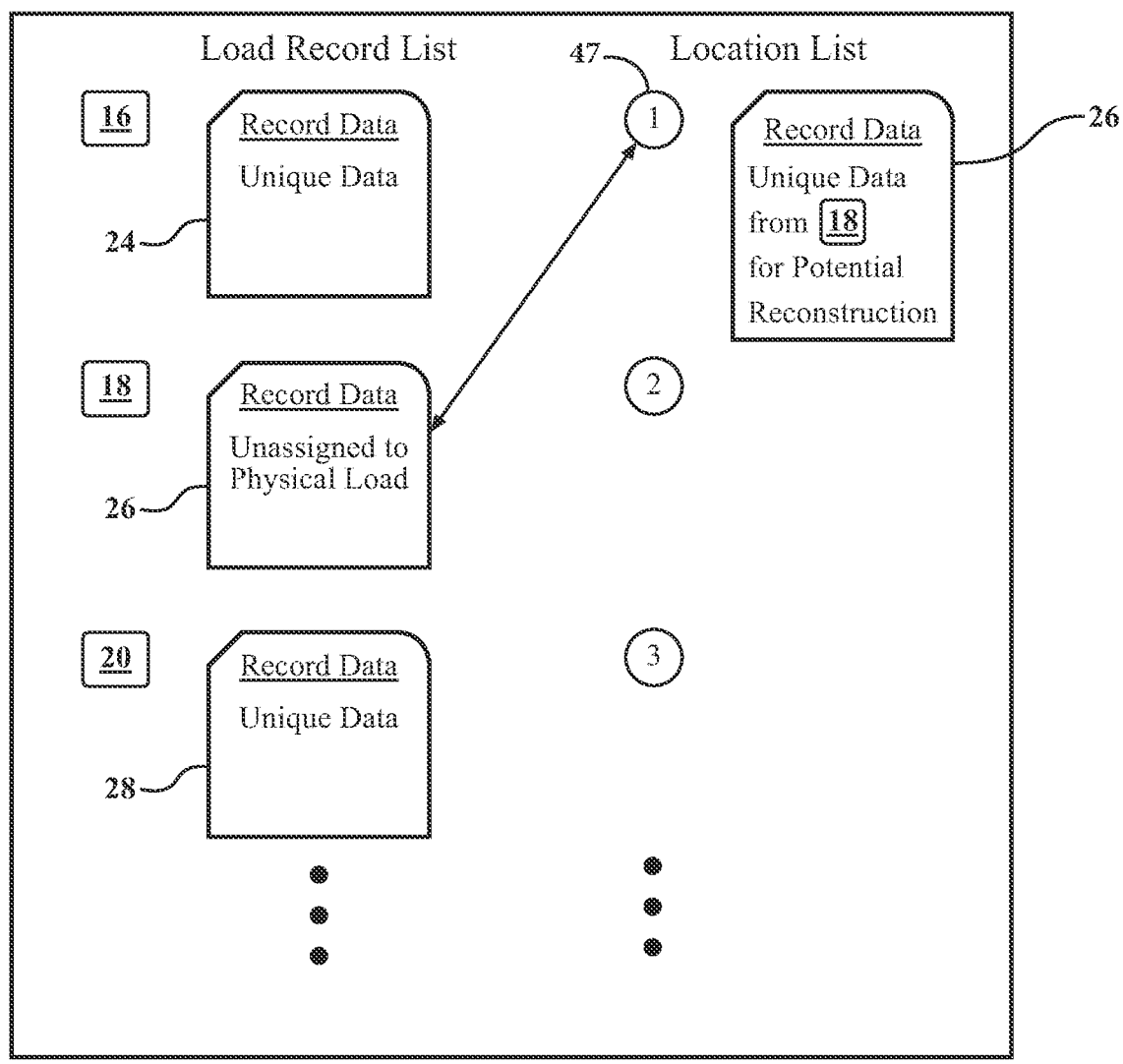
FIG. 9 is a schematic view of record data associated with the loads of the load tracking system after moving in accordance with FIGS. 8A and 8B.

Because the middle load 18 is missing at this point, FIG. 9 shows the state of FIGS. 8A and 8B where the controller 22 classifies the second data record 26 and second location record 47 as available for reconstruction.

Figure 10:
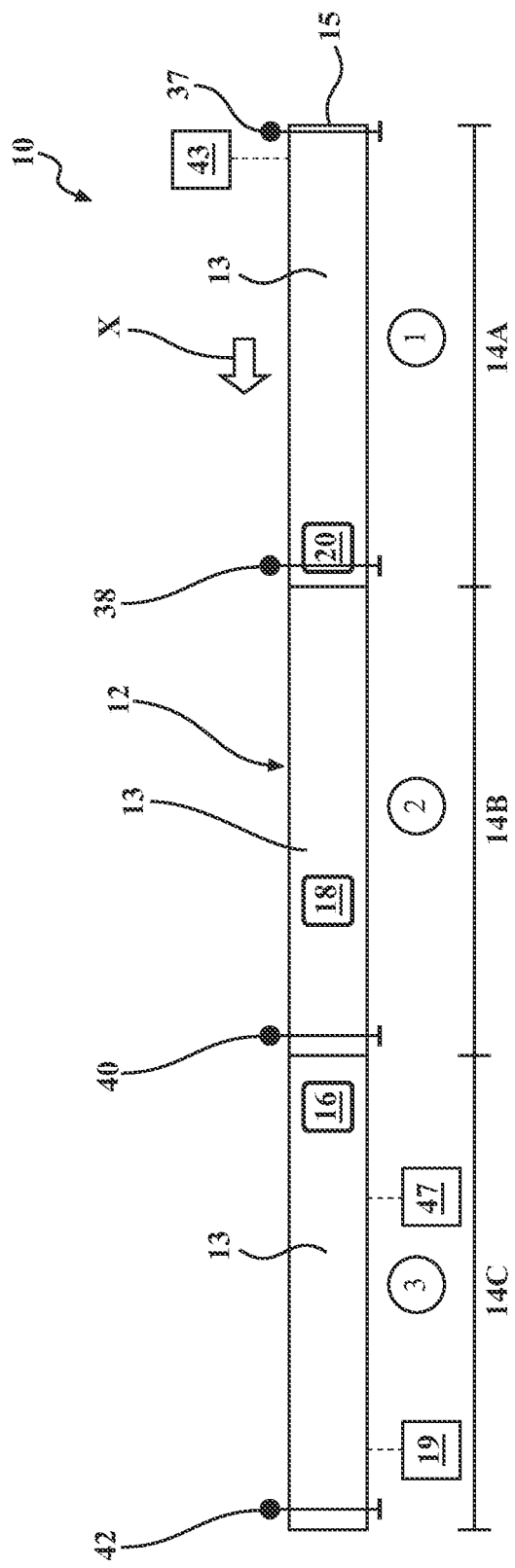
FIG. 10 is a top schematic view of the conveyors, sensors and loads of the load tracking system, illustrating the loads after moving a fourth distance.
Figure 11A:
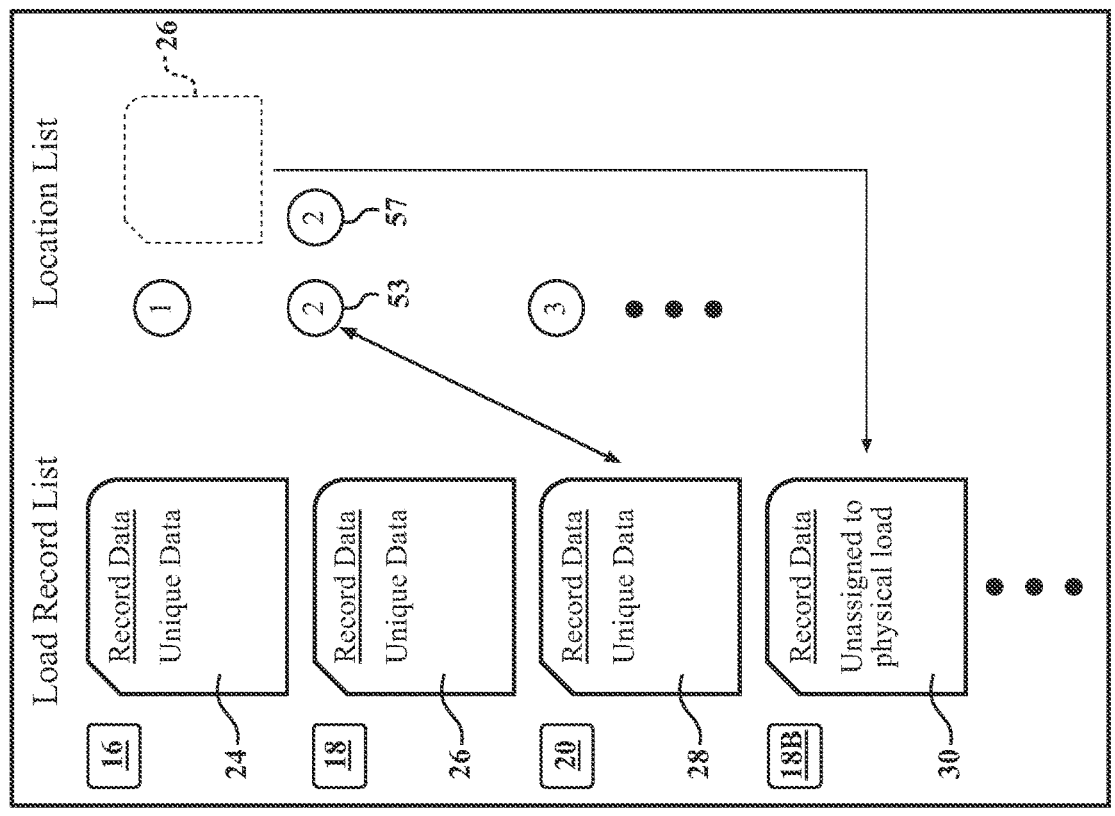
FIG. 11A is a schematic view of record data associated with the loads of the load tracking system prior to a third load moving to the second segment of the conveyor prior to the arrangement presented in FIG. 10.
Figure 11B:
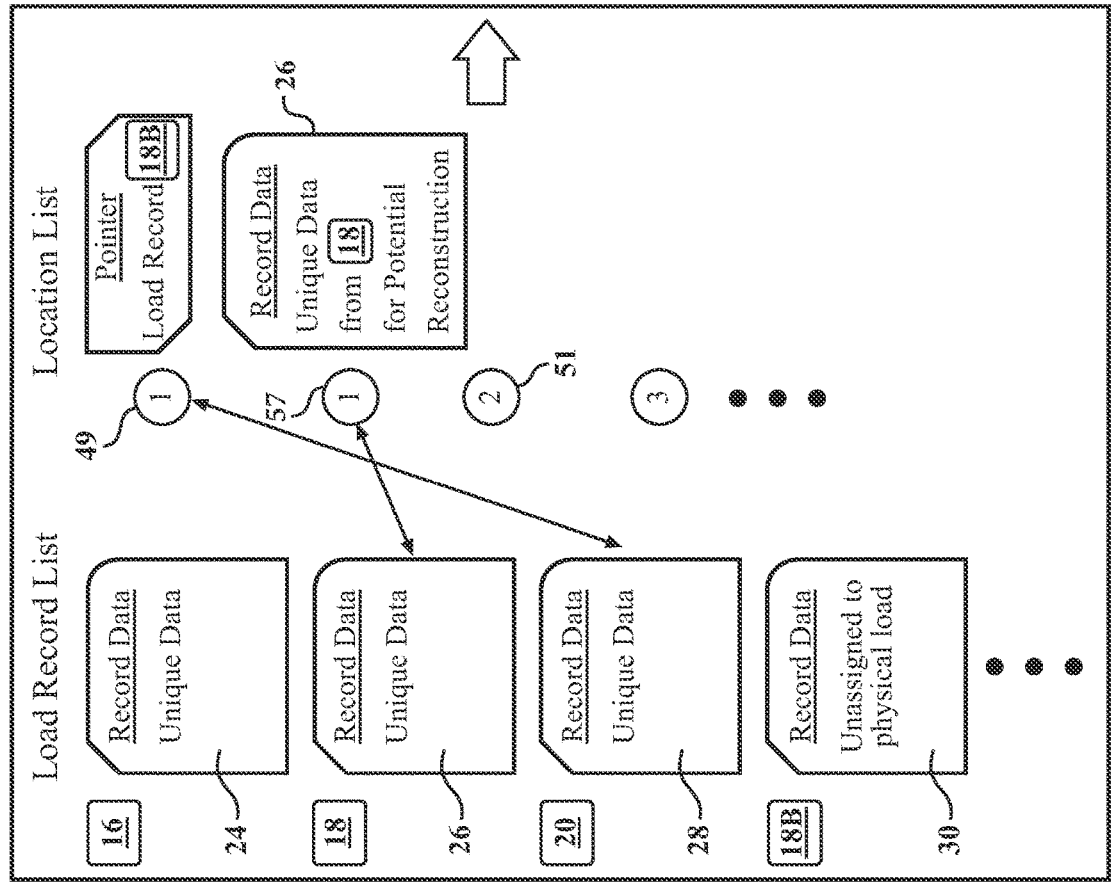
FIG. 11B is a schematic view of record data associated with the loads of the load tracking system after moving in accordance with FIG. 10.
Figure 12:
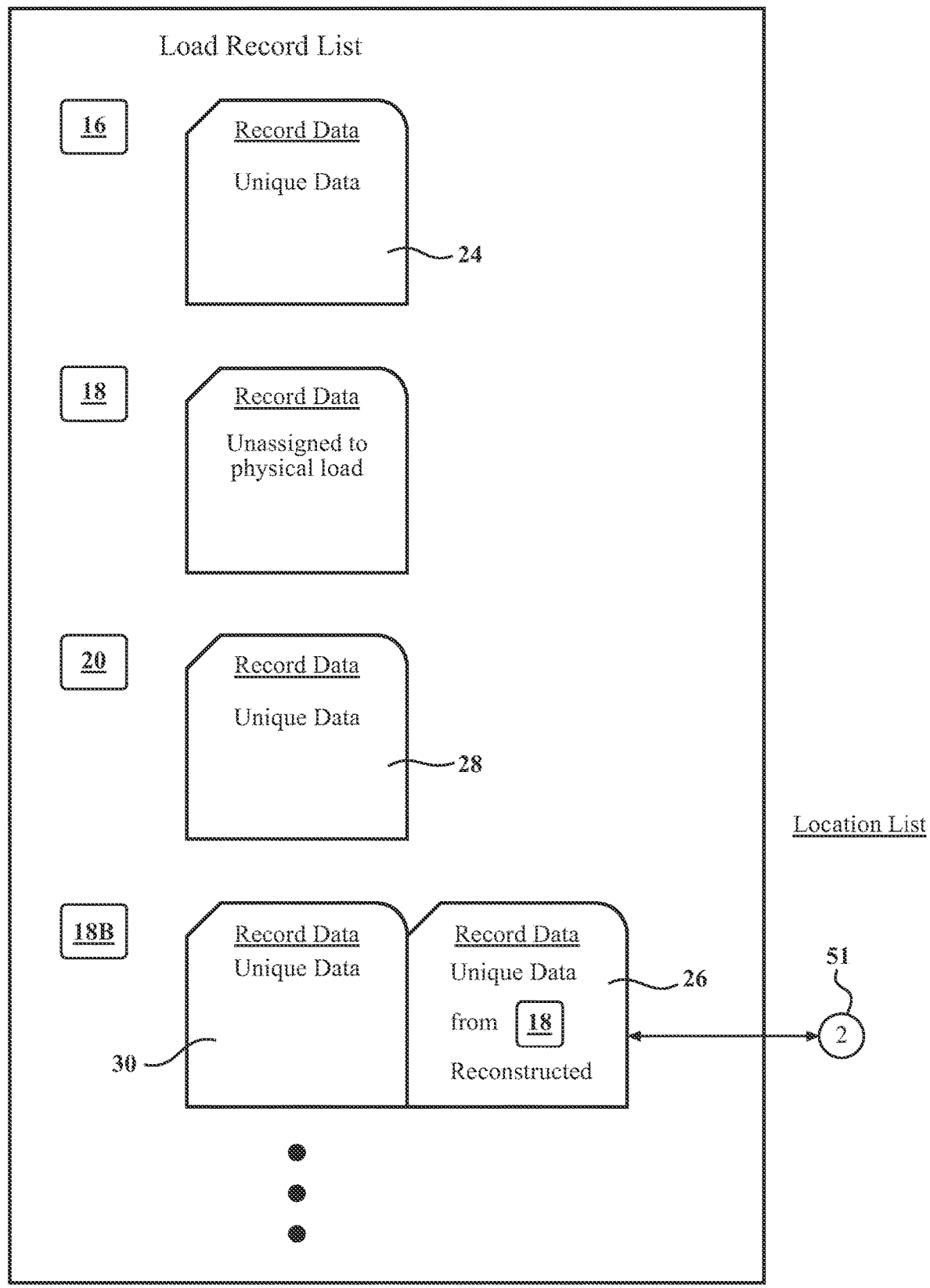
FIG. 12 is a further schematic view of record data associated with the loads of the load tracking system after moving in accordance with FIG. 10.

FIG. 11A illustrates that the third data record 28 associated with the rearward load 20 is linked to the third location record 49 associated with the first segment 14A. As illustrated in FIGS. 10 and 11B, when the rearward load 20 passes by the first sensor 38 in accordance with the rearward load expected load travel distance of the third location record 49, the controller 22 is configured to 122 update the third data record 28 to link to a fourth location record 53 associated with the second conveyor segment 14B and an updated expected load travel distance of the rearward load 20 along the second segment 14B of the conveyor 12. Because a link to an unexpected/missing load exists for the new location record 51 (new data record 30), and the record data of an unsuccessfully tracked load exists under the second data record 26 for rebuild, as illustrated in FIGS. 11B and 12, the controller 22 is configured to 124 disassociate the second data record 26 from the second location record 47, and 126 pair the second data record 26 with the new data record 30 such that the middle load 18 of the second data record 26 is tracked with the new location record 51 of the new data record 30. At this point, as shown in FIG. 12, the record associated with the middle load 18 has been reconstructed. The reconstructed second data record 26 is attached to the new data record 30 associated with the unknown load (i.e., the middle load 18 carries both data sets separately).

It should be appreciated that the above steps may be executed for any load along any length of a conveyor and via use of any of the sensors 38, 40, 42.

In summary, according to the subject system, the controller 22 maintains a list of data records for loads 16, 18, 20 as they travel on one or more segments 14A-C of the belt conveyor 12. The data records include individual data unique to each load 16, 18, 20. The controller 22 maintains a list of location records of the loads 16, 18, 20 on the belt conveyors 12. The controller 22 manages links between the lists in a load tracking model for maintaining an accurate list of where the loads 16, 18, 20 are located. More particularly, the controller 22 measures an amount of travel on the belt conveyor 12 and uses sensor 38, 40, 42 readings events to positively confirm actual loads at physical locations. The controller 22 compares sensor 38, 40, 42 readings to the expected load travel distances of the loads 16, 18, 20. The controller 22 updates the data record and location record links in response to sensor 38, 40, 42 readings. When the controller 22 expects a sensor 38, 40, 42 reading based on a predetermined expected load travel distance and one does not occur, the controller 22 disassociates the data record with the location record. When the controller 22 does not expect a sensor 38, 40, 42 reading based on a predetermined expected load travel distance, but one does occur, the controller 22 assigns a new data record and location record to the newly sensed load (unexpected load).

As previously noted, conventional approaches to load tracking require a load record of a missing load (potential reconstruction record) to remain unavailable which introduces a problem for scaling the load record array. That record cannot be used for new loads in a tracking model if it must contain the missing load information until such time that it may be reconstructed. Therefore, the load record array must be sized relatively large to accommodate an additional load record for every location, and such systems require additional management to determine which individual records changed from recoverable to non-recoverable.

The subject system 10 stores the potential rebuild record with the location record list rather than in a load record array. Each tracking location can only rebuild one record at a time, thus there is no additional scaling. The system 10 also does not require additional management of unavailable records in the load record array. If an event occurs that requires the record to become non-recoverable, it is generated on a per-location basis. No searching through on a per-record basis is required. The subject system 10 also allows for the ability to reconstruct a load at a single location rather than solely at the exit of a group of consecutive locations. The ability to reconstruct a load can also be enabled or disabled for specific locations within a group of locations.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for tracking a plurality of loads on a conveyor, comprising:
   providing a conveyor configured to move the loads in a travel direction relative to an entrance of the conveyor, the conveyor including a plurality of segments arranged in end to end relationship with one another in the travel direction, the plurality of segments including at least a first segment and a second segment;
   providing a first sensor located between the first and second segments;
   associating a designated load of the loads with a designated load data record;
   associating the designated load data record with a designated load location record encompassing the first segment of the conveyor and encompassing designated load expected load travel distances of the designated load in the travel direction along the first segment after associated conveyor travel distances;
   detecting a presence of an unknown load of the loads entering the second segment with the first sensor outside of the designated load expected load travel distances of the designated load location record, and creating a new data record associated with the unknown load;
   associating the new data record with a new location record encompassing the second segment of the conveyor and encompassing new expected load travel distances of the unknown load of the new data record in the travel direction along the second segment after associated conveyor travel distances;
   detecting with the first sensor that the designated load is not present at the first sensor at the designated load expected travel distance associated with the first sensor; and
   disassociating the designated load data record from the designated load location record and pairing the designated load data record with the new data record such that the designated load of the designated load data record is tracked with the new location record of the new data record.

2. The method as set forth in claim 1, further including associating a rearward load of the loads with a rearward load data record, wherein the rearward load is located upstream of the designated load;
   associating the rearward load data record with a rearward load location record encompassing the first segment of the conveyor and encompassing a rearward load expected load travel distances of the rearward load of the rearward load data record in the travel direction along the first segment after associated conveyor travel distances; and
   detecting the rearward load entering the second segment with the first sensor in accordance with the rearward load expected load travel distance of the rearward load location record after detecting the presence of the unknown load to confirm that the designated load is properly paired with the new location record of the new data record.

3. The method as set forth in claim 2, further including associating a frontward load of the loads with a frontward load data record, wherein the frontward load is located downstream of the designated load;
   associating the frontward load data record with a frontward load location record encompassing the first segment of the conveyor and encompassing a frontward load expected load travel distances of the load of the frontward load data record in the travel direction along the first segment after an associated conveyor travel distances; and
   detecting the frontward load entering the second segment with the first sensor in accordance with the frontward load expected load travel distance of the frontward load location record prior to detecting the designated load with the first sensor.

4. The method as set forth in claim 1, wherein the unknown load is detected by the first sensor ahead of the designated load expected travel distance associated with the first sensor.

5. The method as set forth in claim 1, wherein the unknown load is detected by the first sensor after the designated load expected travel distance associated with the first sensor.

6. The method as set forth in claim 1, wherein the predetermined movement of the conveyor in the travel direction is calculated based on a counted number of pulses generated by a shaft of a conveyor pulled counted by an encoder during rotation of the shaft.

7. The method as set forth in claim 6, further including an entrance sensor positioned adjacent to the entrance of the conveyor configured to detect an entrance of the loads on the conveyor, and wherein the encoder is configured to count pulses after detection of the load by the entrance sensor to track the location of the load.

8. A method for tracking a plurality of loads on a conveyor, comprising:
providing a conveyor configured to move the loads in a travel direction relative to an entrance of the conveyor, the conveyor including a plurality of segments arranged in end to end relationship with one another in the travel direction, the plurality of segments including at least a first segment and a second segment;
providing a first sensor located between the first and second segments;
associating a frontward load of the loads with a frontward load data record;
associating the frontward load data record with a frontward load location record encompassing the first segment of the conveyor and encompassing frontward load expected travel distances of the load of the frontward load data record in the travel direction along the first segment after associated conveyor travel distances;
associating a middle load of the loads with a middle load data record, wherein the middle load is located upstream of the frontward load;
associating the middle load data record with a middle load location record encompassing the first segment of the conveyor and encompassing second expected load travel distances of the load of the middle load data record in the travel direction along the first segment after associated conveyor travel distances;
associating a rearward load of the loads with a rearward load data record, wherein the rearward load is located upstream of the middle load;
associating the rearward load data record with a rearward load location record encompassing the first segment of the conveyor and encompassing third expected load travel distances of the load of the rearward load data record in the travel direction along the first segment after associated conveyor travel distances;
detecting the frontward load entering the second segment with the first sensor in accordance with the frontward load expected travel distance of the frontward load location record;
detecting a presence of an unknown load of the loads entering the second segment with the first sensor outside of the second expected load travel distances of the middle load location record, and creating a new data record associated with the unknown load;
associating the new data record with a new location record encompassing the second segment of the conveyor and encompassing new expected load travel distances of the unknown load of the new data record in the travel direction along the second segment after associated conveyor travel distances;
detecting with the first sensor that the middle load is not present at the first sensor at the second expected travel distance associated with the first sensor;
detecting the rearward load entering the second segment with the first sensor in accordance with the third expected load travel distance of the rearward load location record;
disassociating the middle load data record from the middle load location record and pairing the middle load data record with the new data record such that the middle load of the middle load data record is tracked with the new location record of the new data record.

9. The method as set forth in claim 8, wherein the unknown load is detected by the first sensor ahead of the middle load expected travel distance associated with the first sensor.

10. The method as set forth in claim 8, wherein the unknown load is detected by the first sensor after the middle load expected travel distance associated with the first sensor.

11. The method as set forth in claim 8, wherein the predetermined movement of the conveyor in the travel direction is calculated based on a counted number of pulses generated by a shaft of a conveyor pulled counted by an encoder during rotation of the shaft.

12. The method as set forth in claim 11, further including an entrance sensor positioned adjacent to the entrance of the conveyor configured to detect an entrance of the loads on the conveyor, and wherein the encoder is configured to count pulses after detection of the load by the entrance sensor to track the location of the load.

13. A system for conveying and tracking loads, comprising:
a conveyor having an entrance and configured to move the loads in a travel direction;
the conveyor having a plurality of segments arranged in end to end relationship with one another;
a first sensor located between the first and second segments;
a controller configured to execute the following steps;
associate a designated load of the loads with a designated load data record;
associate the designated load data record with a designated load location record encompassing the first segment of the conveyor and encompassing designated load expected travel distances of the designated load in the travel direction along the first segment after associated conveyor travel distances;
detect a presence of an unknown load of the loads entering the second segment with the first sensor outside of the designated load expected travel distances of the designated load location record, and create a new data record associated with the unknown load;
associate the new data record with a new location record encompassing the second segment of the conveyor and encompassing new expected load travel distances of the unknown load of the new data record in the travel direction along the second segment after associated conveyor travel distances;
detect with the first sensor that the designated load is not present at the first sensor at the first expected travel distance associated with the first sensor; and
disassociate the designated load data record from the designated load location record and pair the designated load data record with the new data record such that the designated load of the designated load data record is tracked with the new location record of the new data record.

14. The system as set forth in claim 13, wherein the controller is further configured to:
associate a rearward load of the loads with a rearward load data record, wherein the rearward load is located upstream of the designated load;
associate the rearward load data record with a rearward load location record encompassing the first segment of the conveyor and encompassing rearward load expected load travel distances of the rearward load in the travel direction along the first segment after an associated conveyor travel distances; and detect the rearward load entering the second segment with the first sensor in accordance with the rearward load expected load travel distance after detecting the presence of the unknown load to confirm that the designated load is properly paired with the new location record of the new data record.

15. The system as set forth in claim 14, wherein the controller is further configured to:
associate a frontward load of the loads with a frontward load data record, wherein the frontward load is located upstream of the designated load;
associate the frontward load data record with a frontward load location record encompassing the first segment of the conveyor and encompassing frontward load expected load travel distances of the frontward load in the travel direction along the first segment after associated conveyor travel distances; and
detect the frontward load entering the second segment with the first sensor in accordance with the frontward load expected load travel distance of the frontward load location record prior to detecting the designated load with the first sensor.

16. The system as set forth in claim 13, wherein the conveyor has a shaft, and wherein an encoder is configured to count a number of pulses generated by the shaft, and wherein the controller is configured to calculate predetermined movement of the conveyor in the travel direction based on a counted number of pulses generated by the shaft of the conveyor with the encoder.

17. The system as set forth in claim 13, further including an entrance sensor positioned adjacent to the entrance of the conveyor configured to detect an entrance of the loads on the conveyor, and wherein the encoder is configured to count pulses after detection of the load by the entrance sensor to track the location of the load.

18. The method as set forth in claim 13, wherein the unknown load is detected by the first sensor ahead of the designated load expected travel distance associated with the first sensor.

19. The method as set forth in claim 13, wherein the unknown load is detected by the first sensor after the designated load expected travel distance associated with the first sensor.

* * * * *